(12) United States Patent
Stallings et al.

(10) Patent No.: US 8,453,057 B2
(45) Date of Patent: May 28, 2013

(54) STAGE INTERACTION FOR MOBILE DEVICE

(75) Inventors: Heath Stallings, Colleyville, TX (US);
Brian F. Roberts, Dallas, TX (US);
Donald H. Relyea, Jr., Dallas, TX (US);
Daniel Spurgeon Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 413 days.

(21) Appl. No.: 12/341,500

(22) Filed: Dec. 22, 2008

(65) Prior Publication Data

US 2010/0162160 A1 Jun. 24, 2010

(51) Int. Cl.
*G06F 3/00* (2006.01)

(52) U.S. Cl.
USPC ........... 715/726; 715/789; 715/811; 715/823; 715/835; 715/840; 715/863

(58) Field of Classification Search
USPC .................. 715/726, 771, 784, 788–801, 835, 715/840, 863, 745, 811, 821–825
See application file for complete search history.

(56) References Cited

U.S. PATENT DOCUMENTS

| | | | | |
|---|---|---|---|---|
| 5,642,490 A | * | 6/1997 | Morgan et al. | 715/762 |
| 5,726,687 A | * | 3/1998 | Belfiore et al. | 715/785 |
| 5,745,910 A | * | 4/1998 | Piersol et al. | 715/210 |
| 5,760,773 A | * | 6/1998 | Berman et al. | 715/808 |
| 5,796,401 A | * | 8/1998 | Winer | 345/619 |
| 5,812,862 A | * | 9/1998 | Smith et al. | 715/209 |
| 5,877,765 A | * | 3/1999 | Dickman et al. | 715/738 |
| 5,914,716 A | * | 6/1999 | Rubin et al. | 715/779 |
| 5,914,717 A | * | 6/1999 | Kleewein et al. | 715/843 |
| 5,923,327 A | * | 7/1999 | Smith et al. | 715/784 |
| 5,995,106 A | * | 11/1999 | Naughton et al. | 715/854 |
| 6,043,818 A | * | 3/2000 | Nakano et al. | 715/851 |
| 6,049,336 A | * | 4/2000 | Liu et al. | 715/830 |
| 6,111,573 A | * | 8/2000 | McComb et al. | 715/763 |
| 6,133,914 A | * | 10/2000 | Rogers et al. | 345/661 |
| 6,144,863 A | * | 11/2000 | Charron | 455/566 |
| 6,195,094 B1 | * | 2/2001 | Celebiler | 715/764 |
| 6,229,542 B1 | * | 5/2001 | Miller | 715/782 |
| 6,275,935 B1 | * | 8/2001 | Barlow et al. | 713/182 |
| 6,323,846 B1 | * | 11/2001 | Westerman et al. | 345/173 |
| 6,353,451 B1 | * | 3/2002 | Teibel et al. | 715/803 |
| 6,396,520 B1 | * | 5/2002 | Ording | 715/798 |
| 6,433,801 B1 | * | 8/2002 | Moon et al. | 715/840 |

(Continued)

FOREIGN PATENT DOCUMENTS

EP 626635 A2 * 11/1994
EP 689134 A1 * 12/1995

(Continued)

*Primary Examiner* — Robert Stevens
*Assistant Examiner* — Eric Wiener

(57) ABSTRACT

A device displays, on a screen, a graphical window from a sequence of graphical windows, where the graphical window includes a group of display elements. The device also receives a user input to the graphical window and identifies a type of the user input, where the type of the user input includes a horizontal input or a vertical input. The device displays, on the screen, another graphical window from the sequence of graphical windows when the type of user input is a horizontal input and scrolls through a stack of the display elements within the graphical window when the type of user input is a vertical input.

20 Claims, 12 Drawing Sheets

U.S. PATENT DOCUMENTS

| | | | | |
|---|---|---|---|---|
| 6,545,669 | B1* | 4/2003 | Kinawi et al. | 345/173 |
| 6,570,557 | B1* | 5/2003 | Westerman et al. | 345/173 |
| 6,590,568 | B1* | 7/2003 | Astala et al. | 345/173 |
| 6,677,932 | B1* | 1/2004 | Westerman | 345/173 |
| 6,763,388 | B1* | 7/2004 | Tsimelzon | 709/228 |
| 6,781,575 | B1* | 8/2004 | Hawkins et al. | 345/173 |
| 6,970,749 | B1* | 11/2005 | Chinn et al. | 700/12 |
| 6,976,210 | B1* | 12/2005 | Silva et al. | 715/205 |
| 6,978,127 | B1* | 12/2005 | Bulthuis et al. | 455/412.1 |
| 7,071,943 | B2* | 7/2006 | Adler | 345/473 |
| 7,134,095 | B1* | 11/2006 | Smith et al. | 715/860 |
| 7,231,229 | B1* | 6/2007 | Hawkins et al. | 455/564 |
| 7,283,845 | B2* | 10/2007 | De Bast | 455/566 |
| 7,355,593 | B2* | 4/2008 | Hill et al. | 345/173 |
| 7,362,331 | B2* | 4/2008 | Ording | 345/473 |
| 7,432,928 | B2* | 10/2008 | Shaw et al. | 345/473 |
| 7,434,177 | B1* | 10/2008 | Ording et al. | 715/862 |
| 7,493,573 | B2* | 2/2009 | Wagner | 715/864 |
| 7,506,268 | B2* | 3/2009 | Jennings et al. | 715/786 |
| 7,509,588 | B2* | 3/2009 | Van Os et al. | 715/835 |
| 7,512,898 | B2* | 3/2009 | Jennings et al. | 715/822 |
| 7,526,738 | B2* | 4/2009 | Ording et al. | 715/862 |
| 7,546,554 | B2* | 6/2009 | Chiu et al. | 715/864 |
| 7,561,874 | B2* | 7/2009 | Wang et al. | 455/418 |
| 7,624,357 | B2* | 11/2009 | De Bast | 715/828 |
| 7,642,934 | B2* | 1/2010 | Scott | 341/23 |
| 7,719,542 | B1* | 5/2010 | Gough et al. | 345/581 |
| 7,747,289 | B2* | 6/2010 | Wang et al. | 455/566 |
| 7,783,990 | B2* | 8/2010 | Amadio et al. | 715/809 |
| 7,805,684 | B2* | 9/2010 | Arvilommi | 715/829 |
| 7,853,972 | B2* | 12/2010 | Brodersen et al. | 725/40 |
| 7,856,602 | B2* | 12/2010 | Armstrong | 715/830 |
| 2001/0024195 | A1* | 9/2001 | Hayakawa | 345/173 |
| 2001/0024212 | A1* | 9/2001 | Ohnishi | 345/769 |
| 2002/0015024 | A1* | 2/2002 | Westerman et al. | 345/173 |
| 2002/0015042 | A1* | 2/2002 | Robotham et al. | 345/581 |
| 2002/0024540 | A1* | 2/2002 | McCarthy | 345/844 |
| 2002/0054090 | A1* | 5/2002 | Silva et al. | 345/747 |
| 2002/0191029 | A1* | 12/2002 | Gillespie et al. | 345/810 |
| 2003/0016241 | A1* | 1/2003 | Burke | 345/733 |
| 2003/0048295 | A1* | 3/2003 | Lilleness et al. | 345/738 |
| 2003/0090572 | A1* | 5/2003 | Belz et al. | 348/207.1 |
| 2003/0169298 | A1* | 9/2003 | Ording | 345/810 |
| 2003/0184552 | A1* | 10/2003 | Chadha | 345/581 |
| 2003/0184587 | A1* | 10/2003 | Ording et al. | 345/810 |
| 2003/0206197 | A1* | 11/2003 | McInerney | 345/764 |
| 2004/0121823 | A1* | 6/2004 | Noesgaard et al. | 455/575.1 |
| 2004/0155909 | A1* | 8/2004 | Wagner | 345/854 |
| 2004/0215719 | A1* | 10/2004 | Altshuler | 709/204 |
| 2004/0222975 | A1* | 11/2004 | Nakano et al. | 345/173 |
| 2005/0057524 | A1* | 3/2005 | Hill et al. | 345/173 |
| 2005/0057548 | A1* | 3/2005 | Kim | 345/204 |
| 2005/0060664 | A1* | 3/2005 | Rogers | 715/810 |
| 2005/0060665 | A1* | 3/2005 | Rekimoto | 715/800 |
| 2005/0091609 | A1* | 4/2005 | Matthews et al. | 715/804 |
| 2005/0097089 | A1* | 5/2005 | Nielsen et al. | 707/3 |
| 2005/0134578 | A1* | 6/2005 | Chambers et al. | 345/184 |
| 2005/0229102 | A1* | 10/2005 | Watson et al. | 715/739 |
| 2005/0250438 | A1* | 11/2005 | Makipaa et al. | 455/3.06 |
| 2005/0275636 | A1* | 12/2005 | Dehlin et al. | 345/173 |
| 2005/0289458 | A1* | 12/2005 | Kylmanen | 715/513 |
| 2006/0026536 | A1* | 2/2006 | Hotelling et al. | 715/863 |
| 2006/0075355 | A1* | 4/2006 | Shiono et al. | 715/778 |
| 2006/0112335 | A1* | 5/2006 | Hofmeister et al. | 715/701 |
| 2006/0123360 | A1* | 6/2006 | Anwar et al. | 715/810 |
| 2006/0197753 | A1* | 9/2006 | Hotelling | 345/173 |
| 2006/0236266 | A1* | 10/2006 | Majava | 715/810 |
| 2006/0242596 | A1* | 10/2006 | Armstrong | 715/786 |
| 2006/0242607 | A1* | 10/2006 | Hudson | 715/863 |
| 2006/0271874 | A1* | 11/2006 | Raiz et al. | 715/767 |
| 2006/0277460 | A1* | 12/2006 | Forstall et al. | 715/513 |
| 2006/0282786 | A1* | 12/2006 | Shaw et al. | 715/762 |
| 2006/0284852 | A1* | 12/2006 | Hofmeister et al. | 345/173 |
| 2006/0290661 | A1* | 12/2006 | Innanen et al. | 345/156 |
| 2007/0028269 | A1* | 2/2007 | Nezu et al. | 725/52 |
| 2007/0030362 | A1* | 2/2007 | Ota et al. | 348/239 |
| 2007/0055947 | A1* | 3/2007 | Ostojic et al. | 715/800 |
| 2007/0067272 | A1* | 3/2007 | Flynt et al. | 707/3 |
| 2007/0083911 | A1* | 4/2007 | Madden et al. | 725/135 |
| 2007/0124677 | A1* | 5/2007 | de los Reyes et al. | 715/705 |
| 2007/0157089 | A1* | 7/2007 | Van Os et al. | 715/702 |
| 2007/0177803 | A1* | 8/2007 | Elias et al. | 382/188 |
| 2007/0189737 | A1* | 8/2007 | Chaudhri et al. | 386/125 |
| 2007/0243862 | A1* | 10/2007 | Coskun et al. | 455/418 |
| 2007/0245250 | A1* | 10/2007 | Schechter et al. | 715/760 |
| 2007/0288862 | A1* | 12/2007 | Ording | 715/788 |
| 2008/0005703 | A1* | 1/2008 | Radivojevic et al. | 715/863 |
| 2008/0122796 | A1* | 5/2008 | Jobs et al. | 345/173 |
| 2008/0125180 | A1* | 5/2008 | Hoffman et al. | 455/566 |
| 2008/0161045 | A1* | 7/2008 | Vuorenmaa | 455/556.1 |
| 2008/0168367 | A1* | 7/2008 | Chaudhri et al. | 715/764 |
| 2008/0182628 | A1* | 7/2008 | Lee et al. | 455/566 |
| 2008/0184112 | A1* | 7/2008 | Chiang et al. | 715/700 |
| 2008/0216017 | A1* | 9/2008 | Kurtenbach et al. | 715/823 |
| 2008/0259045 | A1* | 10/2008 | Kim et al. | 345/173 |
| 2009/0007017 | A1* | 1/2009 | Anzures et al. | 715/835 |
| 2009/0064055 | A1* | 3/2009 | Chaudhri et al. | 715/863 |
| 2009/0199128 | A1* | 8/2009 | Matthews et al. | 715/799 |
| 2010/0095238 | A1* | 4/2010 | Baudet | 715/784 |
| 2010/0105454 | A1* | 4/2010 | Weber et al. | 463/1 |

FOREIGN PATENT DOCUMENTS

| | | | |
|---|---|---|---|
| EP | 844553 A1 * | 5/1998 | |
| EP | 1143334 A2 * | 10/2001 | |
| EP | 1517228 A2 * | 3/2005 | |
| FR | 2819675 A1 * | 7/2002 | |
| GB | 2329813 A * | 3/1999 | |
| JP | 2005309933 A * | 11/2005 | |
| WO | WO 9938149 A1 * | 7/1999 | |
| WO | WO 2007069835 A1 * | 6/2007 | |

* cited by examiner

STAGE INTERACTION FOR MOBILE DEVICE

BACKGROUND

Mobile devices (e.g., cell phones, personal digital assistants (PDAs), etc.) can be configured to use an increasing amount and variety of applications. For example, a mobile device may use telephone applications, organizers, email applications, instant messaging (IM) applications, games, cameras, image viewers, etc. Mobile device users typically launch an application by selecting an icon (or shortcut) to activate the application. Despite the large number of options, such users still desire to find and select a desired icon quickly. However, the available display sizes of many mobile devices may limit the number of icons that can be effectively presented to the users. Existing user interfaces may provide one of a variety of menu formats that group menu items into categories and sub-categories. These user interfaces may require a user to "drill down" through multiple menus to select a desired icon or other item.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
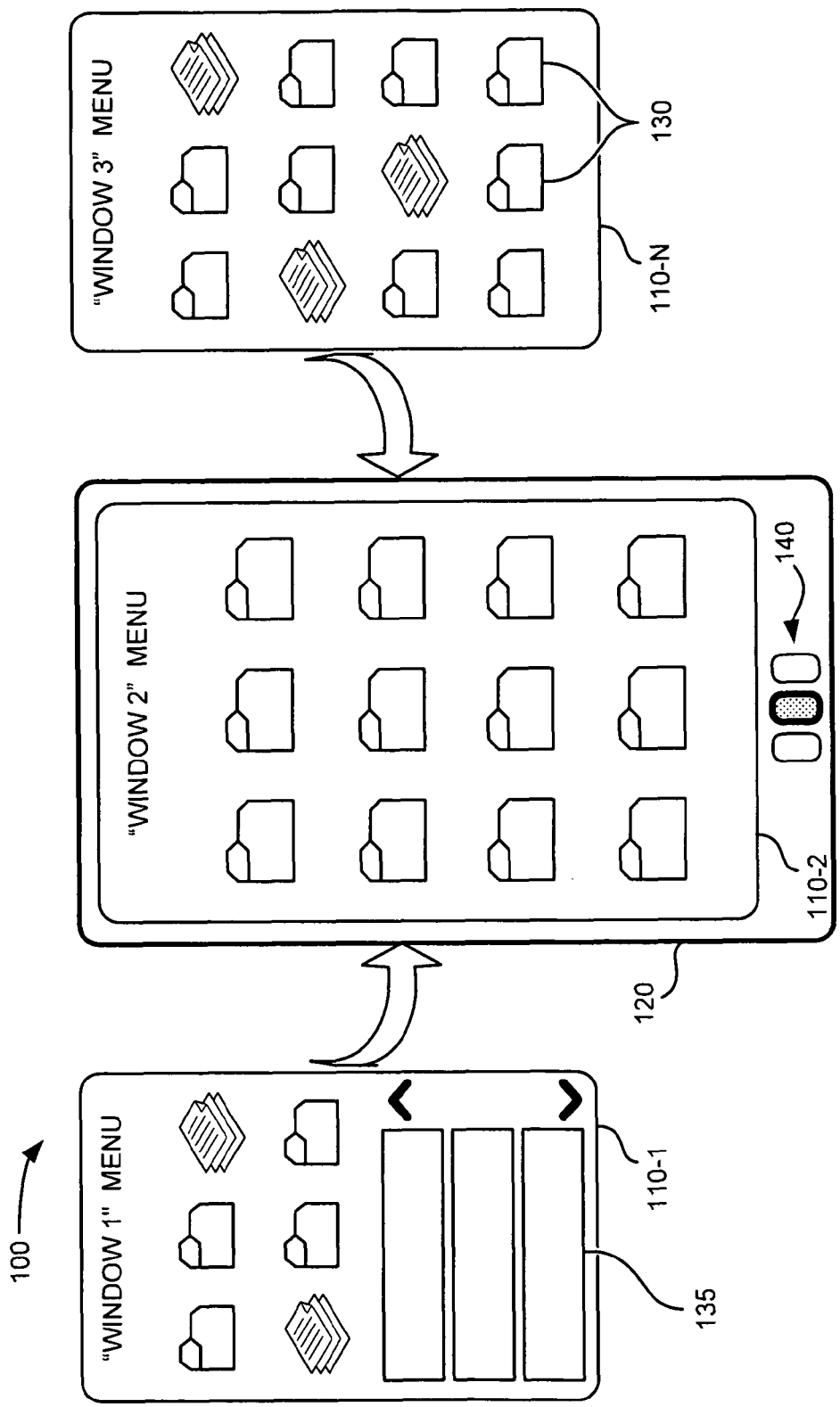
FIG. 1 depicts a diagram of an exemplary implementation of the concepts described herein.

Systems and/or methods described herein may provide a stage-based user interface for a mobile device (e.g., a cell phone, a PDA, a personal computer, a laptop computer, a remote control, etc.). FIG. 1 provides a diagram illustrating an exemplary implementation of a stage-based user interface 100. Stage-based user interface 100 may include separate graphical windows 110-1, 110-2, . . . 110-N (referred to herein collectively as "windows 110" and singularly as "window 110") that can be presented to the user by sliding each window onto a display stage 120. Display stage 120 may include, for example, all or a portion of a display of a mobile device.

Each window 110 of stage-based user interface 100 may present display elements (e.g., keys, icons, buttons, links, etc.) 130 and/or information that may be unrelated to the other windows 110. For example, one window 110 may include a unique group of application icons, while another window 110 may include different icons for particular applications. Additionally, some display elements 130 may be presented within window 110 as a vertical stack 135 that a user may scroll through vertically to display additional display elements 130. User input, such as a horizontal touch gesture on a touch-sensitive screen, may be applied to slide a new window 110 onto display stage 120. In one implementation, user input for items displayed within a particular window 120 may be limited to item selections and/or vertical touch gestures. In some implementations, stage-based user interface 100 may include a dynamic footer 140 to indicate a relative position of a displayed window (e.g., window 110-2) among the other windows (e.g., windows 110-1, 110-N). Thus, systems and/or methods described herein may provide a user interface that can be implemented with few gestures/keystrokes and can minimize the need to "drill down" through multiple menus.

Although FIG. 1 shows an exemplary stage-based user interface 100, in other implementations, stage-based user interface 100 may be arranged differently than depicted in FIG. 1. For example, windows 110 may include a different number and/or arrangement of display elements 130. Also, stage-based user interface 100 may include a different number and/or arrangement of windows 110 on stage 120 and/or different arrangement of footer 140 within stage 120.

Figure 2:
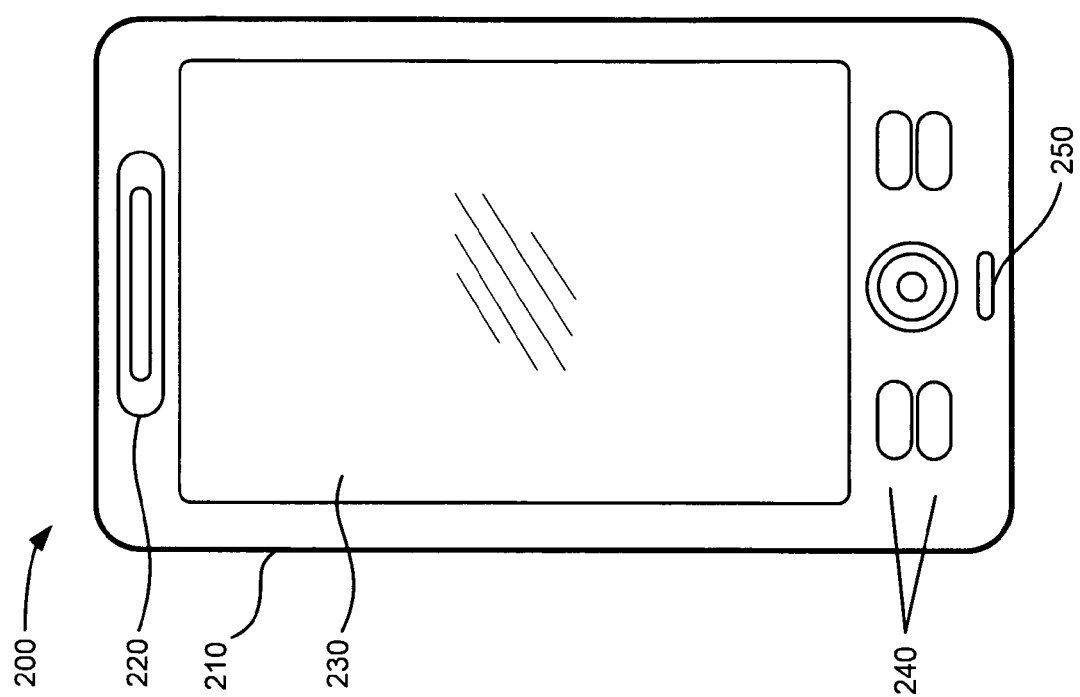
FIG. 2 depicts a diagram of an exemplary device in which systems and/or methods described herein may be implemented.

FIG. 2 is a diagram of an exemplary device 200 in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a portable gaming system, a global positioning system (GPS) device, a printer, a facsimile machine, a pager, a camera (e.g., a contemporary camera or a digital camera), a video camera (e.g., a camcorder), a calculator, binoculars, a telescope, a personal computer, a laptop computer, any other device capable of receiving user input to a display, a thread or process running on one of these devices, and/or an object executed by one of these devices.

As illustrated in FIG. 2, device 200 may include a housing 210, a speaker 220, a display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, display 230, control buttons 240 and/or microphone 250.

Speaker 220 may provide audible information to a user of device 200. Speaker 220 may be located in an upper portion of device 200, and may function as an ear piece when a user is engaged in a communication session using device 200.

Speaker 220 may also function as an output device for music and/or audio information associated with games and/or video images played on device 200.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc.

In one implementation, display 230 may include a touch screen display that may be configured to receive user input when a user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-screen-enabled display 230 may also identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. For example, in some implementations device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
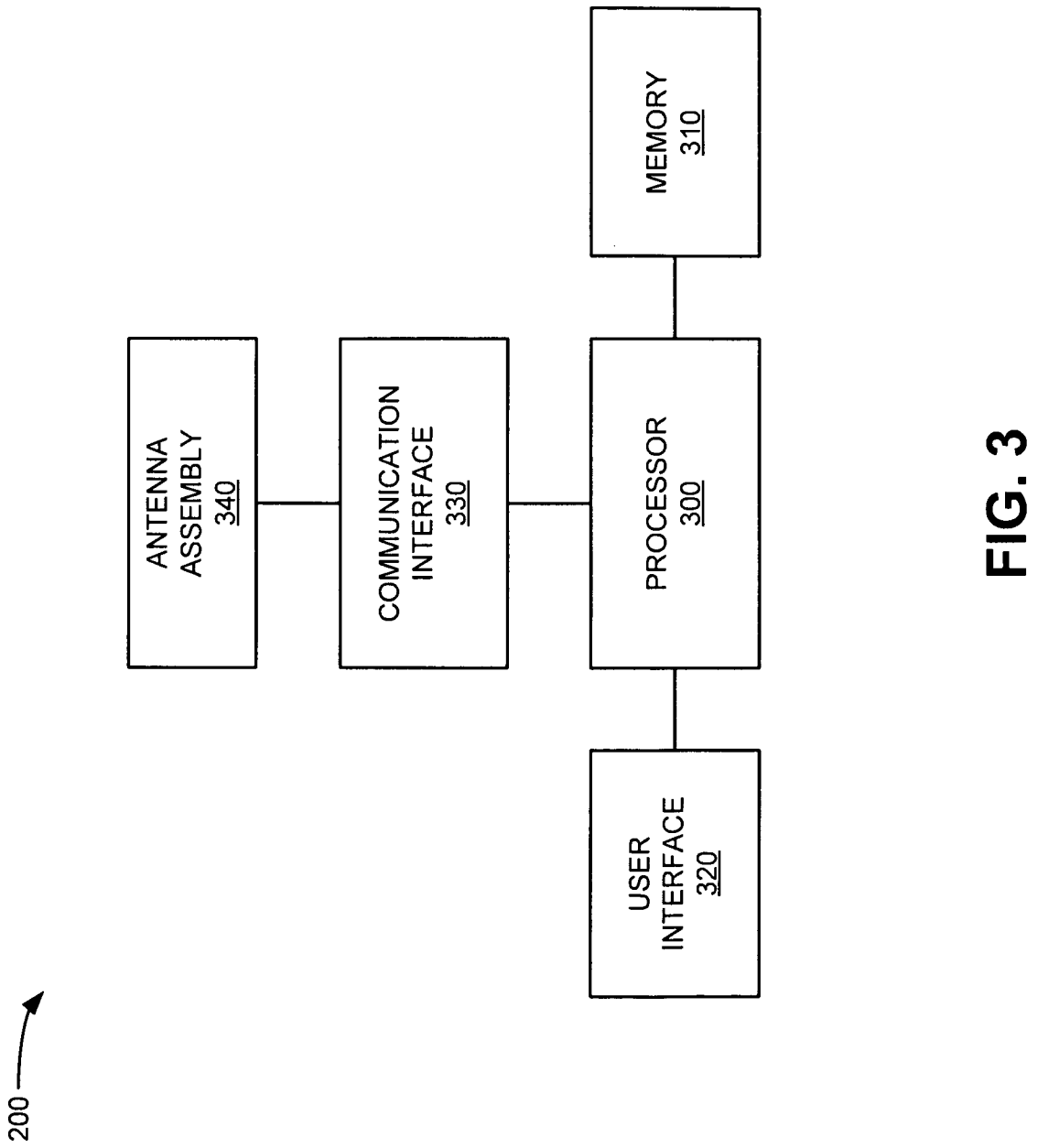
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as quick-access menu arrangement 100 on display 230.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and/or to output visual information (e.g., time-related items received by device 200); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
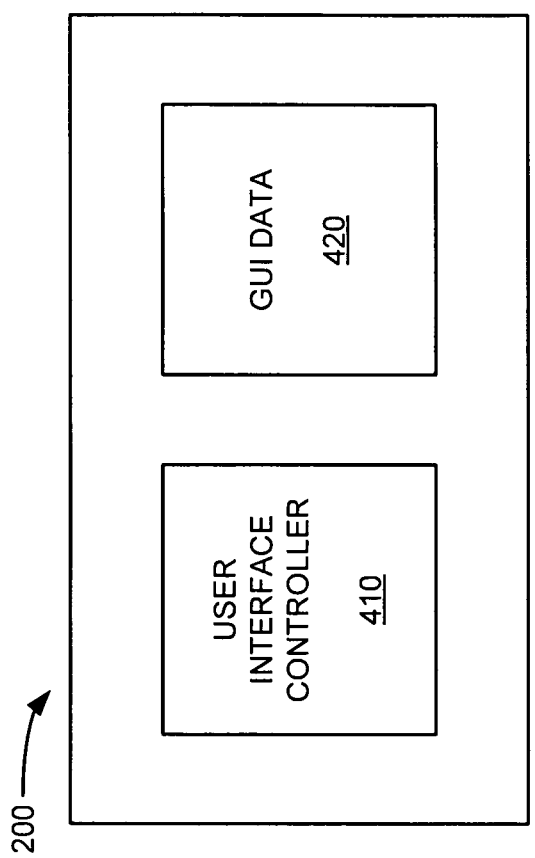
FIG. 4 depicts a diagram of exemplary functional components of the device illustrated in FIG. 2.

FIG. 4 provides a diagram of exemplary functional components of device 200. As shown in FIG. 4, device 200 may include a user interface controller 410 and graphical user interface (GUI) data 420. Device 200 may also include other peripheral applications (not shown) that provide communication to and other services for device 200. Peripheral applications may include, for example, a telephone application, a text-messaging application, an email application, an instant messaging (IM) application, a calendar application, a multi-media messaging service (MMS) application, a short message service (SMS) application, an image viewing application, a camera application, an organizer, a video player, an audio application, a GPS application, etc.

User interface controller 410 may generate and update a graphical user interface for a sliding window menu arrangement (e.g., stage-based user interface 100). In one implementation, user interface controller 410 may assemble display elements 130 based on one or more templates. Templates may include for example, arrangements for groups of display elements 130 associated with each of windows 110 of stage-based user interface 100. For example, user interface controller 410 may retrieve, from GUI data 420, a display element 130 representing a peripheral application, may apply stored user preferences, and may insert display elements 130 into a graphic template. User interface controller 410 may also receive display elements 130 from peripheral applications within device 200. In one implementation, display elements 130 may include links to applications and/or files (e.g., particular objects that can be presented on one of the applications). In other implementations, display elements 130 may include a combination of links along with other information relating to particular applications.

User interface controller 410 may receive input to identify what display elements 130 may be assigned to a particular window 110. User interface controller 410 may store window assignments, for example, in GUI data 420. User interface controller 410 may also include logic to present footer 140 in an activated or deactivated mode. User interface controller 410 may also store trigger information to detect, for example, when footer 140 may be activated/deactivated. In one implementation, when footer 140 is in an activated mode, user interface controller 410 may track user input to footer 140 and display a window 110 corresponding to a currently selected item in footer 140.

GUI data 420 may include information that may be used by user interface controller 410 to compile windows 110. In one implementation, GUI data 420 may be included within memory 310. GUI data 420 may include, for example, user preferences, images, and triggers related to stage-based user interface 100. Exemplary user preferences may include format preferences for particular windows 110 (e.g., font/icon sizes, colors, window titles, backgrounds, etc.), transition animations for switching between windows 110 (e.g., slide in/out, wipe orientations, scattering, etc.), sequencing of windows 110, footer 140 icons associated with each window, and window 110 assignments for display elements 130. In some implementations, window 110 assignments for display elements 130 (e.g., the particular display elements 130 associated with each window 110) may be user-configurable. In other implementations, display elements 130 may include a combination of default display elements 130 and user-selected display elements 130.

Images may include images associated with display elements 130 (e.g., icons for applications and/or files), background images for windows 110, etc. Triggers related to stage-based user interface 100 may include, for example, particular user input to display 230 that may cause a change to stage 120.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5:
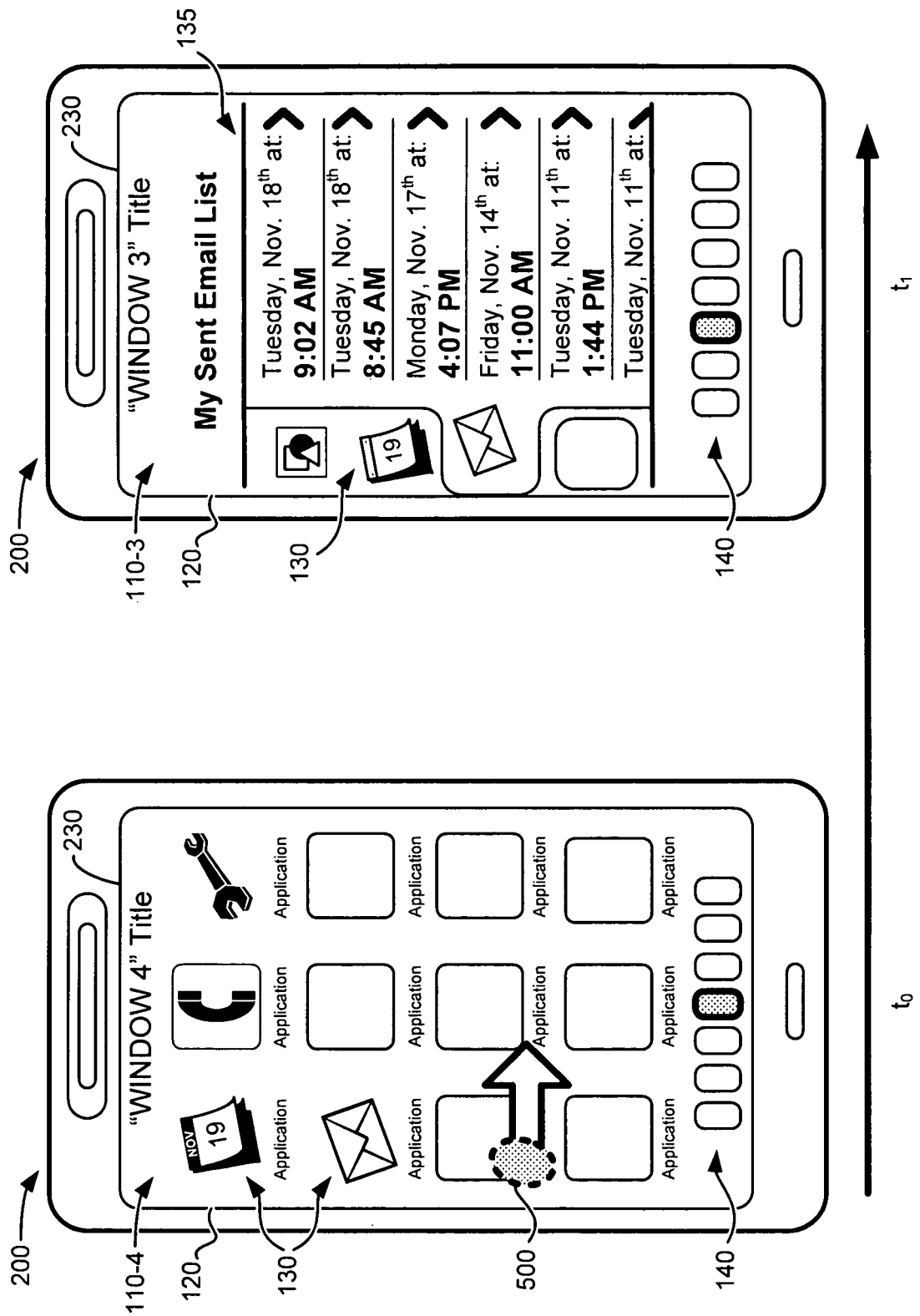
FIG. 5 illustrates exemplary sliding window operations capable of being performed by the device depicted in FIG. 2.

FIG. 5 illustrates exemplary sliding window operations capable of being performed by a device, such as device 200. In FIG. 5, stage-based user interface 100 is shown as a function of time progressing from time $t_0$ time $t_1$. At time $t_0$, window 110-4 may be displayed. Window 110-4 may include a group of display elements 130 previously assigned to window 110-4. Display elements 130 shown in window 110-4 may be selected by a user to, for example, launch an application associated with a display element 130. Also, footer 140 may be shown at the bottom of stage 120. Stage 120 may encompass an entire available viewing area of the display (e.g., display 230). Footer 140 may include an indication of where window 110-4 lies in a sequence of available windows 110. As shown in FIG. 5, at time $t_0$, window 110-4 may be shown as the fourth in a sequence of seven windows 110. At time $t_0$, a user may apply a touch 500 to touch-sensitive display 230 in the area of window 110-4. Touch 500 may slide in the direction indicated on FIG. 5, which device 200 may interpret as a horizontal gesture to change the window viewable on stage 120. Window 110-4 may appear to scroll to user's the right.

At time $t_1$, another window 110-3 may be presented to the user. As shown by footer 140, window 110-3 may be the next window (to the user's apparent left of window 110-4) in the sequence of available windows 110 of stage-based user interface 100. Depending on the horizontal gesture interpreted by device 200 (e.g., the speed and/or length of the slide of touch 500), device 200 may scroll to the next window (e.g., window 110-3) in the sequence of window 110 or device 200 may scroll past multiple windows 110. Window 110-3 may include a group of display elements 130 and vertical stack 135 (e.g., a list of items related to a particular display element). Display elements 130 and/or other information shown in window 110-3 may be unrelated to or may overlap with the display elements 130 shown in window 110-4. For example, as shown in FIG. 5, window 110-3 may include display elements 130 and a list of information associated with an email application. A user may select one of display elements 130 (e.g., using a "tap" touch gesture), scroll down a list of information (e.g., using a vertical touch gesture), or switch to another window 110 (e.g., using a horizontal touch gesture). Thus, a user can manipulate stage-based user interface 100 using just three basic gestures. In other implementations described below, other types of user input may be used to manipulate stage-based user interface 100.

Figure 6:
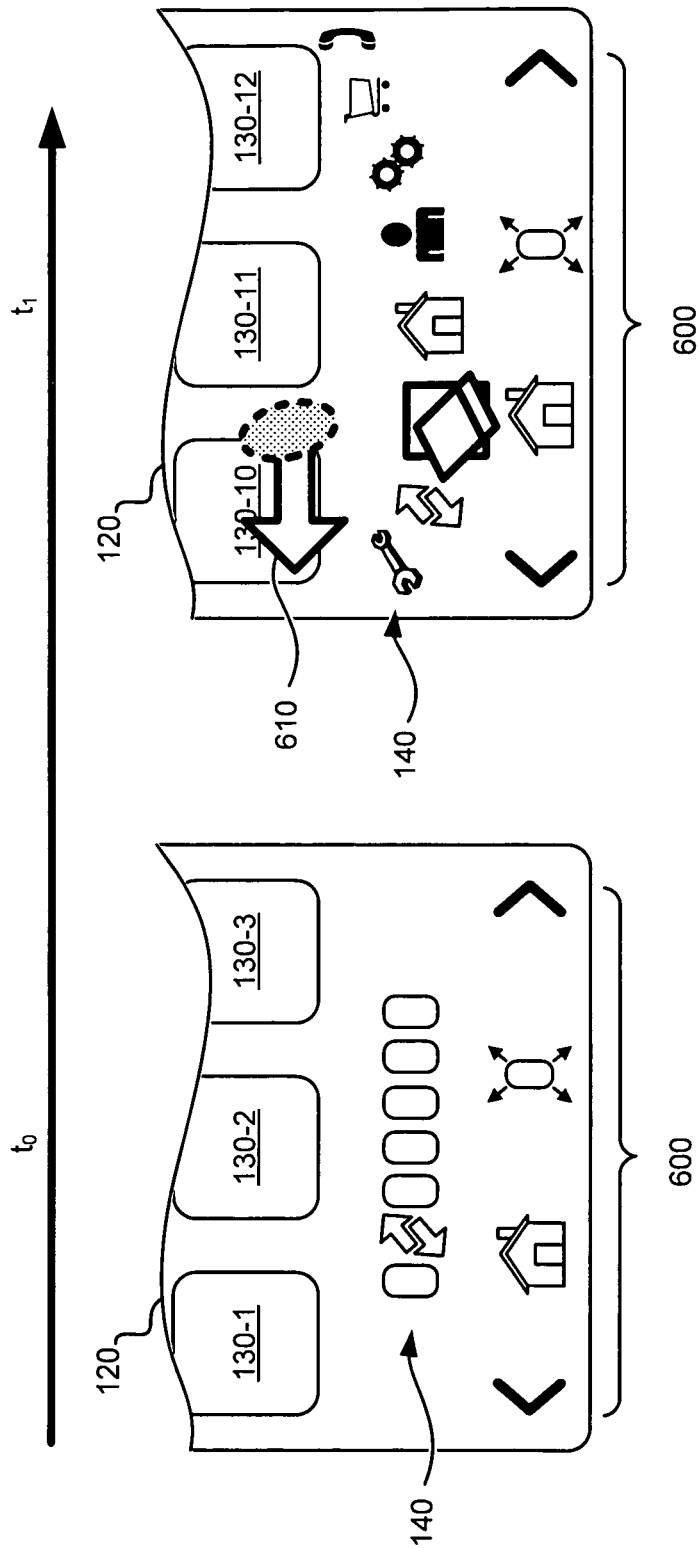
FIG. 6 provides examples of a footer arrangement for a stage-based user interface according to implementations described herein.

FIG. 6 provides an example of a stage-based user interface 100 according to implementations described herein. More particularly, FIG. 6 provides partial views of stage 120 as a function of time progressing from time $t_0$ time $t_1$. At time $t_0$, stage 120 is shown with footer 140 in an inactive state. In the implementation of FIG. 6, inactive footer 140 may indicate where the currently displayed window lies in a sequence of available windows 110. For the currently displayed window, footer 140 may show an icon or symbol that may correspond to the types of display elements 130 and/or information included in the current window. The relative position of other windows within footer 140 may be indicated, for example, by small blank windows (as shown), dots, or other generic place indicators. Stage 120 may optionally include a set of command icons 600, which may be used to direct the display of windows 110 on stage 120. Command icons 600 may include, for example, left/right icons to change between windows, a home window button to jump directly to a designated main/home window, a magnification button to zoom in/out of a window, and/or a full-screen icon to toggle between a full-stage window presentation and a smaller window presentation (e.g., to better accommodate sliding between windows). In an exemplary implementation, horizontal gestures applied to the smaller window presentation may be interpreted as a command to switch to another window 110, while horizontal gestures applied to the full-stage window presentation may be interpreted as a user input within the currently displayed window 110.

At time $t_1$ of FIG. 6, a user may provide a horizontal gesture in the form of a sliding touch 610. Touch 610 may activate footer 140, causing display 200 to generate a dynamic view of footer 140. The dynamic view of footer 140 may display icons/symbols corresponding to each available window in stage-based user interface 100. As the user causes the windows to slide into and out of stage 120, footer 140 may indicate the currently displayed window to the user and the relative location of the other available windows. The icon of footer 140 corresponding to the currently displayed window 110 may be indicated, for example, by color, position, relative size, etc.

Figure 7:
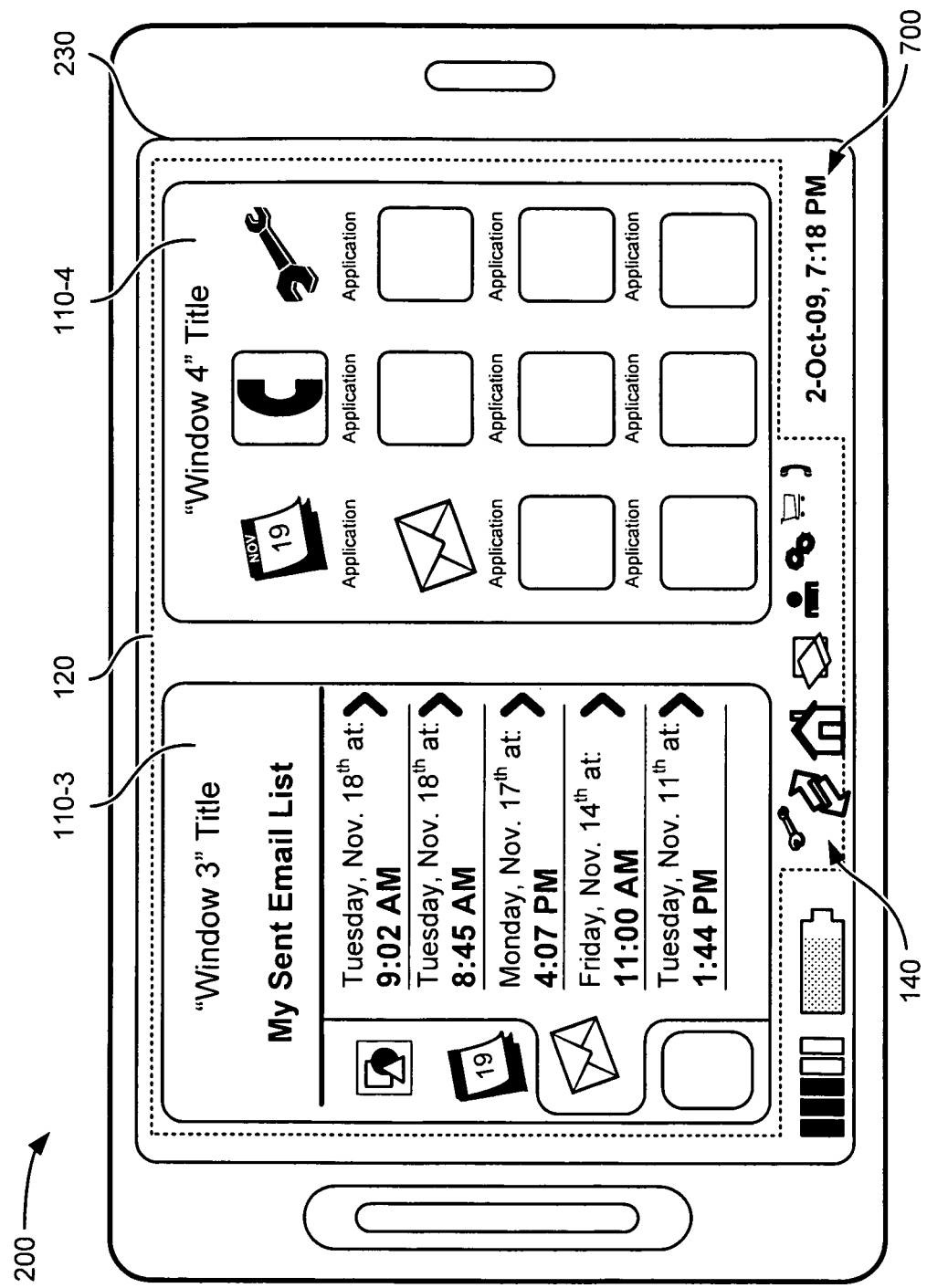
FIG. 7 provides an example of the stage-based user interface according to another implementation.

FIG. 7 provides an example of a stage-based user interface according to another implementation. A shown in FIG. 7, device 200 may include display 230. Display 230 may show stage 120 that is configured to display two windows 110-3 and 110-4 and footer 140. Each window 110-3, 110-4 on stage 120 may include display elements (e.g., display elements 130) and/or information that may be related or unrelated to display elements and/or information in the other window 110-3, 110-4. Footer 140 may display icons/symbols corresponding to each available window in stage-based user interface 100. Footer 140 may indicate the currently displayed windows 110-3, 110-4 to the user relative to the sequence of the other available windows 110. Stage 120 may not encompass the entire viewable area of display 230, leaving room for other information 700 that may not be affected by user input to stage-based user interface 100.

Although FIG. 7 shows an exemplary stage-based user interface including two windows on stage 120, in other implementations, device 200 may contain fewer, different, or additional window arrangements than depicted in FIG. 7. For example, in one implementation, device 200 may display more than two windows on stage 120. In another exemplary implementation, two or more windows may be displayed with a partial overlapping of the windows. In still another implementation, windows 110-3 and 110-4 may be displayed simultaneously on separate screens of the same device (e.g., a device with screens on both sides of an open clamshell-type housing). In such an implementation, footer 140 may span both screens or be duplicated on each of the screens.

Figure 8:
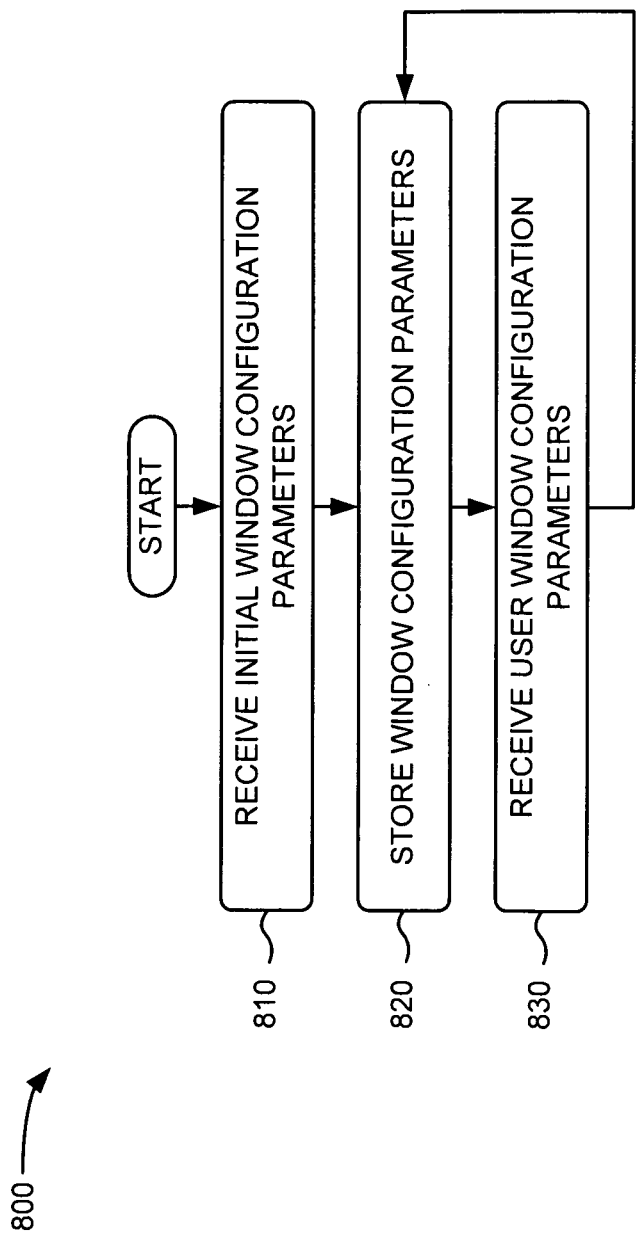
FIG. 8 depicts a flow chart of an exemplary process for configuring a window of the stage-based user interface according to implementations described herein.

FIG. 8 depicts a flow chart of an exemplary process 800 for configuring a window of a stage-based user interface according to implementations described herein. In one implementation, process 800 may be performed by device 200. The process may begin by receiving initial window configuration parameters (block 810) and storing the window configuration parameters (block 820). For example device 200 (e.g., user interface controller 410) may receive window configuration parameters from, for example, an original equipment manufacturer (OEM) or software provider. Initial window configuration parameters may include, for example, templates for particular windows, sequencing of windows, user input triggers (e.g., touch gestures, control buttons, keypad input, etc.), icons/images, transition animations, and links to particular content, links to particular applications, and/or links to particular memory locations (e.g., a "my pictures" folder, a documents folder, etc.). The initial windows configuration parameters may be stored, for example, in memory 310 of device 200.

User window configuration parameters may be received (block 830). For example, device 200 may receive user input to supplement (e.g., personalize) the initial windows configuration parameters. User windows configuration parameters may include, for example, user preferences, additional images/icons, and different sequencing of windows 110. User windows configuration parameters may also include ordering display elements 130 within particular windows. The user windows configuration parameters may be provided, for example, via user interface 320. Additionally, user windows configuration parameters may be downloaded from another source (e.g., via communication interface 330 of device 200). User windows configuration parameters may continue to be added and updated throughout the lifecycle of stage-based user interface 100. The user windows configuration parameters may be stored, for example, in memory 310 of device 200.

Figure 9:
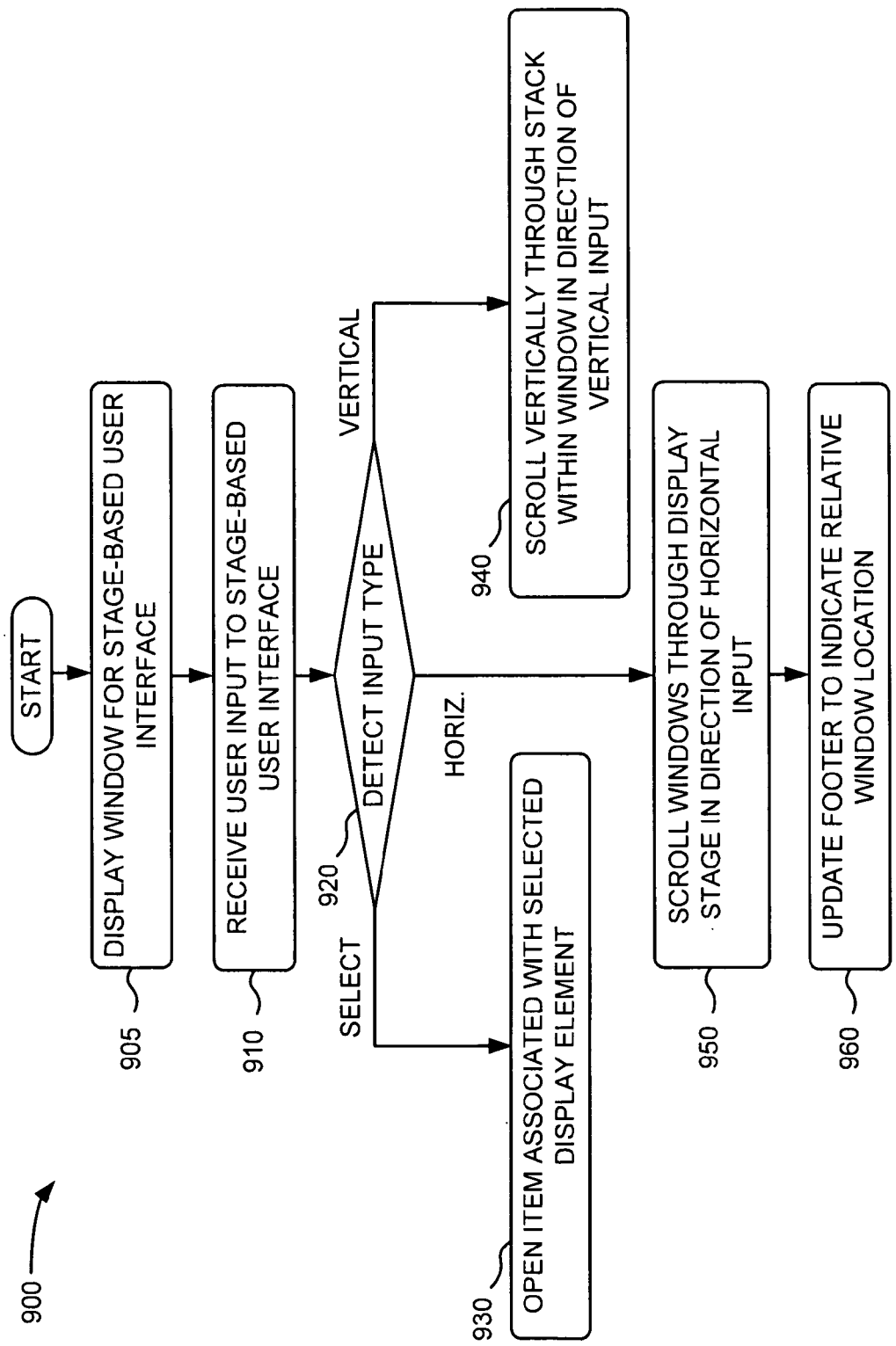
FIG. 9 depicts a flow chart of an exemplary process for providing the stage-based user interface according to implementations described herein.

FIG. 9 depicts a flow chart of an exemplary process 900 for providing a stage-based user interface according to implementations described herein. In one implementation, the process depicted in FIG. 9 may be performed by device 200. The process may begin by displaying a window for a stage-based user interface (block 905) and receiving user input to the stage-based user interface (block 910). For example, device 200 may display a window (e.g., window 110) from a sequence of windows for the stage-based user interface (e.g., stage-based user interface 100). Device 200 may receive user input to the displayed window from a user in a variety of forms. In one implementation, the user input may be in the form of a touch gesture (such as a tap to select an icon, a horizontal slide, or a vertical slide) on a touch-sensitive display (e.g., display 230). In another implementation, the user input may be in the form of a control button (e.g., control button 240), such as a dedicated button to indicate a selection or a directional indicator (such as a joystick or trackball) to indicate a vertical or horizontal scroll. In a further implementation, the user input may be in the form of a keypad or keyboard input, such as a "Tab" or "Enter" key to indicate a selection, or an arrow key to indicate a vertical or horizontal direction input. In other implementations, different forms of user input or a combination of forms of user input may be used.

The type of input may be determined (block 920). For example, device 200 may determine if the user input is one of a horizontal direction input, a vertical direction input, or a selection input. If the type of input is a selection input (block 920—SELECT), an item associated with the selected display element may be opened (block 930). For example, device 200 may open an item, such as a file, application or other object associated with one of display elements 130.

If the type of input is a vertical direction input (block 920—VERTICAL), a stack within a window may be scrolled vertically in the direction of the vertical input (block 940). For example, device 200 may scroll up or down a stack (e.g., stack 135) within a currently selected window. The stacks may include, for example, a list of display elements (e.g., display elements 130).

If the type of input is a horizontal direction input (block 920—HORIZ.), windows may be scrolled through a display stage in the direction of the horizontal input (block 950) and a footer may be updated to indicate the relative window location (block 960). For example, device 200 may remove the currently displayed window from a stage (e.g., display stage 120) and display the next window in the window sequence of the stage-based user interface 100. Device 200 may also modify the presentation of a footer (e.g., footer 140) to indicate the position of the newly displayed window within the window sequence of the stage-based user interface 100.

Figure 10:
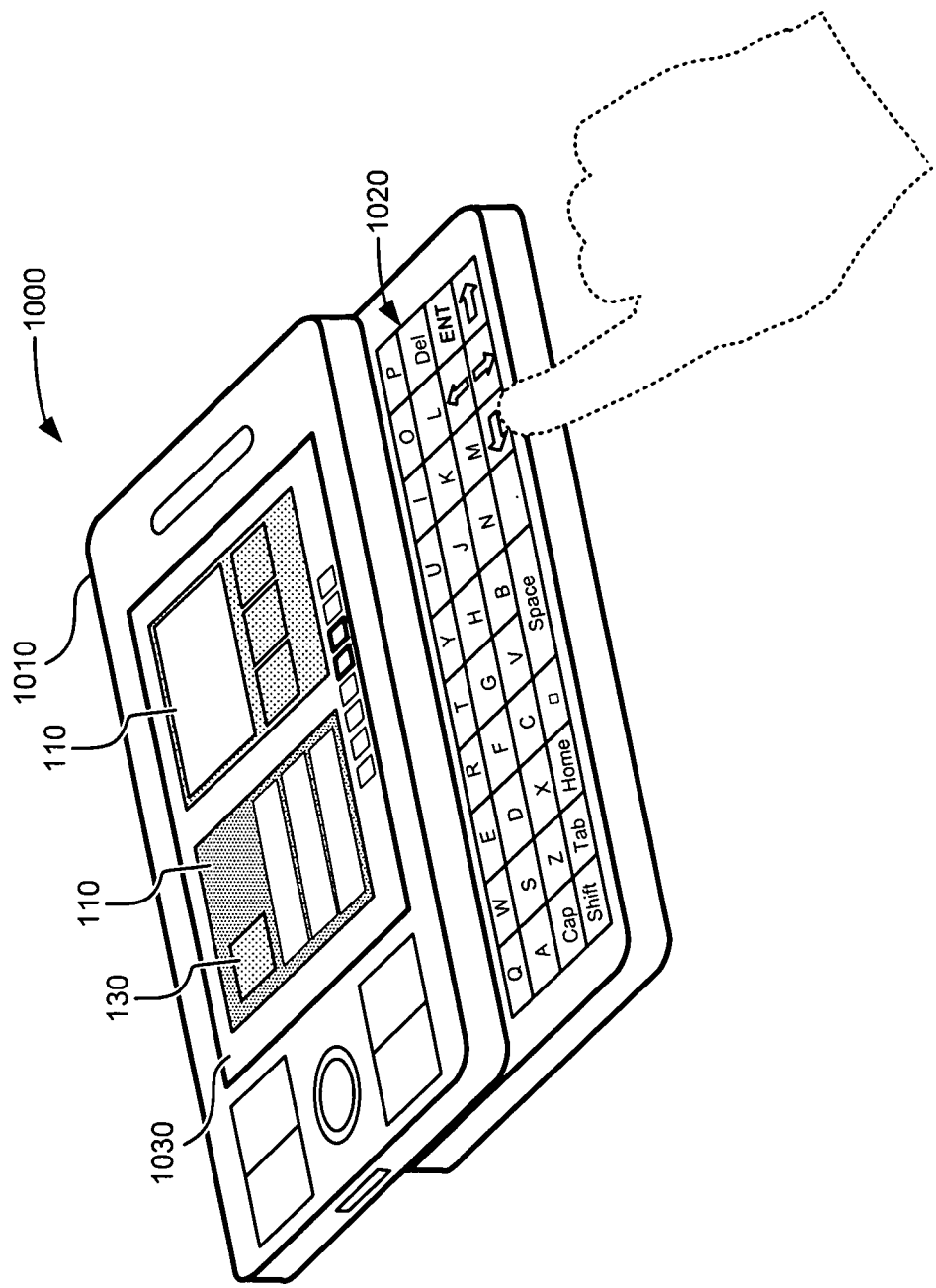
FIG. 10 provides an illustration of an exemplary implementation of a control-button interface on a mobile device.
Figure 11:
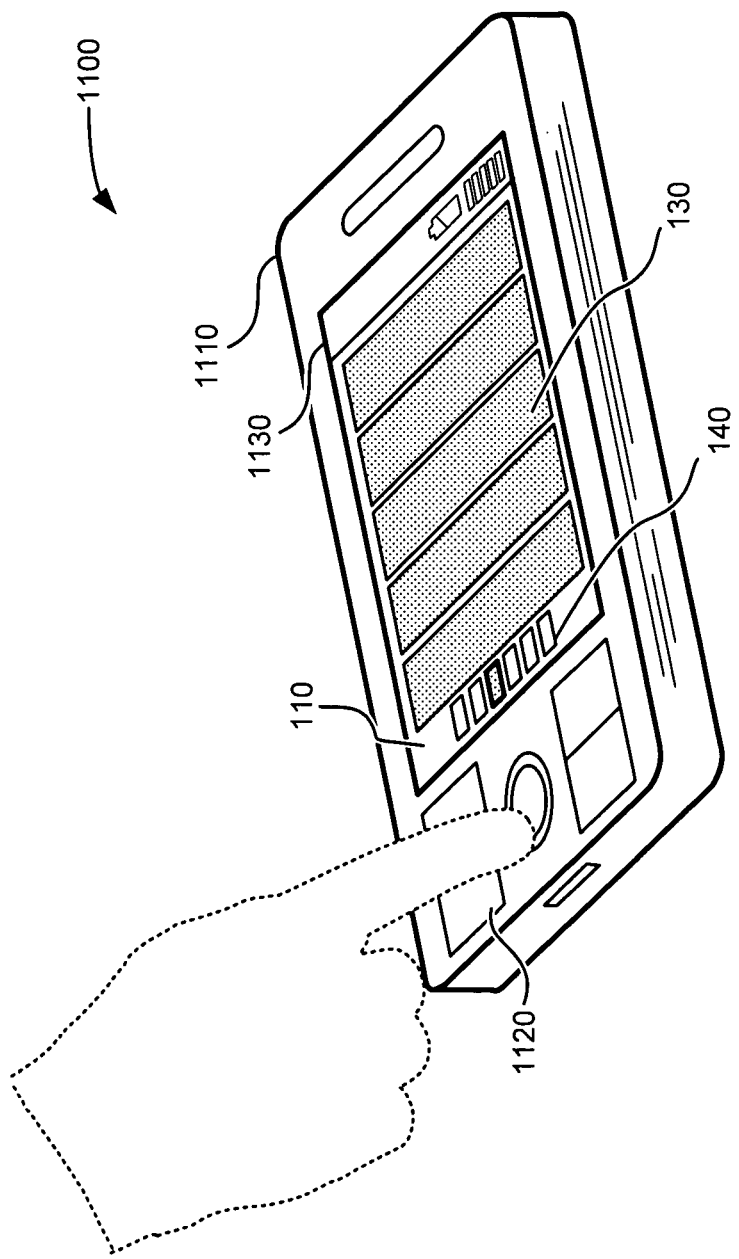
FIG. 11 provides an illustration of an exemplary implementation of a touch-pad interface on a mobile device.
Figure 12:
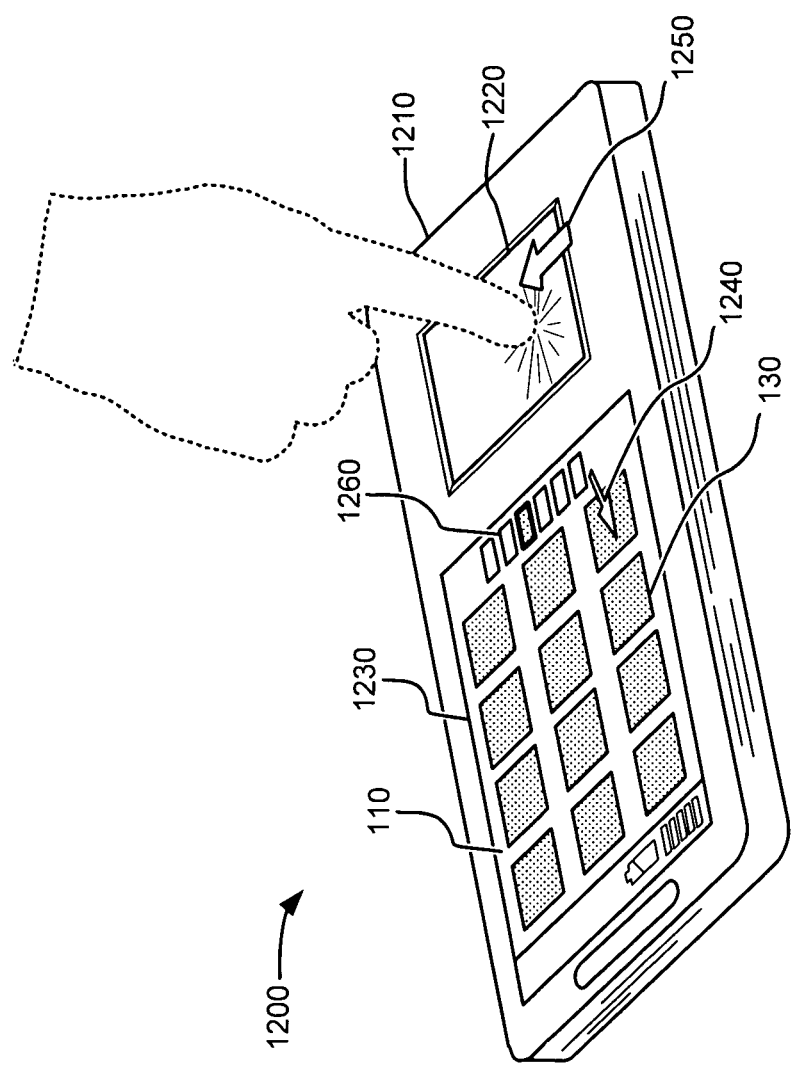
FIG. 12 provides an illustration of an exemplary implementation of a key-pad interface and a dual window display on a mobile device.

FIGS. 10-12 provide illustrations of exemplary user input for a stage-based user interface on a variety of devices. FIG. 10 provides an illustration of an exemplary implementation of user input for a stage-based user interface on a device 1000 with a QWERTY-like keypad. Device 1000 may include a housing 1010, a keypad 1020, and a display 1130. Other components, such as control buttons, a microphone, a camera, connectivity ports, memory slots, and/or speakers, may be located on device 1100, including, for example, on a rear, sliding, or side panel of housing 1010. Although FIG. 10 shows exemplary components of device 1000, in other implementations, device 1000 may contain fewer, different, differently arranged, or additional components than depicted in FIG. 10.

User input on keypad 1020 may be associated with display 1030 by, for example, toggling between defined user input locations within a window (using, e.g., a "Tab" key or a letter key associated with a display element 130 within a window 110). For example, in one implementation, a user may toggle between display elements 130 within window 110 by using, for example, vertical arrow keys and/or "Tab" keys of keypad 1020. A display element 130 may be selected by pressing, for example, an "Enter" key of keypad 1020 after highlighting display element 130 using the arrow keys and/or "Tab" keys. Windows within stage-based user interface may be changed, for example, by using horizontal arrows on keypad 1020.

FIG. 11 provides an illustration of an exemplary implementation of user input for a stage-based user interface on a device 1100 that may include a housing 1110, control buttons 1120, and a display 1130. Other components, such as a keypad, a microphone, a camera, connectivity ports, memory slots, and/or speakers, may be located on device 1100, including, for example, on a rear, sliding, or side panel of housing 1110. Although FIG. 11 shows exemplary components of device 1100, in other implementations, device 1100 may contain fewer, different, differently arranged, or additional components than depicted in FIG. 11.

User input via control buttons 1120 may be associated with display 1130 by, for example, toggling between defined user input locations within a window. For example, in one implementation, control buttons 1120 may include a dedicated control button to activate stage-based user interface 100. Once activated, a user may toggle vertically between display elements 130 within window 110 by using, for example, a joystick, trackball, or direction pad associated with control buttons 1120. A display element 130 may be selected by pressing, for example, another one of control buttons 1120 after highlighting display element 130 using the joystick, trackball, or direction pad. Windows 110 within stage-based user interface may be changed, for example, by using horizontal direction indications on control buttons 1120.

FIG. 12 provides an illustration of an exemplary implementation of user input for a stage-based user interface on a device 1200 that may include a housing 1210, a touch panel 1220, and a display 1230. Other components, such as control buttons, a keypad, a microphone, a camera, connectivity ports, memory slots, and/or speakers, may be located on device 1200, including, for example, on a rear or side panel of housing 1210. Although FIG. 12 shows exemplary components of device 1200, in other implementations, device 1200 may contain fewer, different, differently arranged, or additional components than depicted in FIG. 12.

FIG. 12 illustrates touch panel 1220 being separately located from display 1230 on housing 1210. Touch panel 1220 may include any resistive touch panel technology or other technology that provides the ability to register a set of touch coordinates. User input on touch panel 1220 may be associated with display 1230 by, for example, movement and location of a cursor 1240. User input on touch panel 1220 may be in the form of the touch of nearly any object, such as a body part (e.g., a finger, as shown) or a pointing device (e.g., a stylus, pen, etc.).

Touch panel 1220 may be operatively connected with display 1230 to allow the combination of touch panel 1220 and display 1230 to be used as an input device. Touch panel 1220 may identify movement of an object as it moves on the surface of touch panel 1220. As described above with respect to, for example, FIGS. 5 and 6, device 1200 may display on display 1230 a stage-based user interface that accepts (via touch panel 1220) user input to window 110. In the example of FIG. 12, the touch on touch panel 1220 may be a sliding touch in a direction 1250 indicated. Device 1200 may detect the sliding touch on touch panel 1220 as a horizontal direction input and may replace the current window with the next window in the window sequence of the stage-based user interface. Device 1200 may also update footer 1260 to indicate the position of the newly displayed window within the window sequence of the stage-based user interface.

Systems and/or methods described herein may display, on a stage area of a computer display, a graphical window from a sequence of graphical windows. The graphical window may include a group of display elements. User input to the graphical window may be received and the type of user input identified. The type of the user input may include a horizontal input, a vertical input, or a selection input. If the type of user input is a horizontal input, the device may display on the stage another graphical window from the sequence of graphical windows. If the type of user input is a vertical input, the device may scroll through a stack of the display elements within the graphical window. If the type of user input is a selection input, the device may associate the location of the selection input with a particular display element of the group of display elements and launch an application associated with the particular display element.

The foregoing description of implementations provides illustration and description, but is not intended to be exhaustive or to limit the invention to the precise form disclosed. Modifications and variations are possible in light of the above teachings or may be acquired from practice of the invention.

For example, while implementations herein have been described primarily in the context of a mobile device (such as a radiotelephone, a PCS terminal, or a PDA), in other implementations the systems and/or methods described herein may be implemented on other computing devices such as a laptop computer, a personal computer, a tablet computer, an ultra-mobile personal computer, or a home gaming system.

Also, while series of blocks have been described with regard to FIGS. 8 and 9, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
    displaying, on a screen of the computing device, a graphical window from a sequence of graphical windows, the graphical window including a group of display elements;
    displaying, on the screen of the computing device, a footer to indicate a relative position of the displayed graphical window among the sequence of graphical windows;
    receiving a user input to the graphical window;
    identifying the user input as a horizontal input; and
    displaying, on the screen of the computing device and based on the horizontal input, another graphical window from the sequence of graphical windows,
    the footer being displayed in an inactive state prior to the horizontal input and including first graphical images, and the footer being displayed in an active state, including a plurality of second graphical images that are each associated with a different graphical window of the sequence of graphical windows and each unique to information displayed in each different graphical window, based on the horizontal input, a plurality of the first graphical images being different than the plurality of the second graphical images.

2. The computing device-implemented method of claim 1, where the user input further includes a selection input, the method further comprising:
    associating a location of the user input with a particular display element of the group of display elements based on the user input including the selection input; and
    launching an application associated with the particular display element based on the user input including the selection input.

3. The computing device-implemented method of claim 1, where the user input further includes a vertical input, the method further comprising:
    scrolling, based on the vertical input, through a stack of the display elements within the graphical window.

4. The computing device-implemented method of claim 1, where the group of display elements include a link to one or more of:
    a telephone application,
    a text-messaging application,
    an email application,
    an instant messaging (IM) application,
    a calendar application,
    a multimedia messaging service (MMS) application, or
    a short message service (SMS) application.

5. The computing device-implemented method of claim 1, where the user input includes:
    a touch on a touch-sensitive display.

6. The computing device-implemented method of claim 1, where the user input includes one of:
    an input from a device guiding a cursor,
    an input from one of a set of control buttons, or
    an input from a keypad.

7. The computing device-implemented method of claim 1, further comprising:
    displaying, beside the graphical window on the screen of the computing device, another graphical window from the sequence of graphical windows, the other graphical window including a different group of display elements.

8. The computing device-implemented method of claim 1, where the computing device comprises one or more of:
    a radiotelephone,
    a personal communications system (PCS) terminal, or
    a personal digital assistant (PDA).

9. The computing device-implemented method of claim 1, where the computing device comprises one or more of:
    a laptop computer,
    a personal computer,
    a tablet computer,
    an ultra-mobile personal computer,
    a personal gaming system, or
    a global positioning system (GPS) unit.

10. A device comprising:
    a touch-sensitive display;
    a memory to store a plurality of instructions; and
    a processor to execute instructions in the memory to:
        display, on the touch-sensitive display, a graphical window from a sequence of graphical windows, the graphical window including a group of display elements;
        display, on the touch-sensitive display, a footer to indicate a relative position of the displayed graphical window among the sequence of graphical windows;
        receive a user input to the graphical window;
        identify the user input as a horizontal input;
        display, on the touch-sensitive display and based on the horizontal input, another graphical window from the sequence of graphical windows,
        the footer being displayed in an inactive state prior to the horizontal input and including first graphical images, and the footer being displayed in an active state, including a plurality of second graphical images that are each associated with a different graphical window of the sequence of graphical windows and each unique to information displayed in each different graphical window, based on the horizontal input, a plurality of the first graphical images being different than the plurality of the second graphical images.

11. The device of claim 10, where the user input further includes a vertical input, and where the processor further executes instructions in the memory to:
    scroll, based on the vertical input, through a stack of the display elements within the graphical window.

12. The device of claim 10, where the user input further includes a selection input, and where the processor further executes instructions in the memory to:
    launch, based on the selection input, an application associated with the particular display element.

13. The device of claim 10, where the group of display elements includes a link to one or more of:
    a telephone application,
    a text-messaging application,
    an email application,
    an instant messaging (IM) application,
    a calendar application,
    a multimedia messaging service (MMS) application, or
    a short message service (SMS) application.

14. The device of claim 10, where the device comprises one or more of:
    a radiotelephone,
    a personal communications system (PCS) terminal,
    a personal digital assistant (PDA),
    a laptop computer,
    a personal computer, a tablet computer,
an ultra-mobile personal computer,
a camera,
a gaming system, or
a global positioning system (GPS) unit.

15. The device of claim 10, further comprising one or more of:
a set of control buttons, or
a keypad,
where the processor further executes instructions in the memory to receive the user input to the graphical window from the set of control buttons or the keypad.

16. A device comprising:
means for displaying, on a screen of the computing device, a graphical window from a sequence of graphical windows, the graphical window including a group of display elements;
means for displaying, on the screen of the computing device, a footer to indicate a relative position of the displayed graphical window among the sequence of graphical windows;
means for receiving a user input to the graphical window;
means for identifying the user input as a horizontal input;
means for displaying, on the screen of the computing device and based on the horizontal input, another graphical window from the sequence of graphical windows;
means for associating a location of the horizontal input with a particular display element of the group of display elements,
the footer being displayed in an inactive state prior to the horizontal input and including first graphical images, and the footer being displayed in an active state, including a plurality of second graphical images that are each associated with a different graphical window of the sequence of graphical windows and each unique to information displayed in each different graphical window, based on the horizontal input, a plurality of the first graphical images being different than the plurality of the second graphical images.

17. The device of claim 16, further comprising:
means for identifying a selection input in connection with a particular display element; and
means for launching, based on the selection input, an application associated with the particular display element.

18. The device of claim 16, further comprising:
means for identifying a vertical input; and
means for scrolling, based on the vertical input, through a stack of the display elements within the graphical window.

19. The device of claim 16, further comprising
means for displaying, on the screen of the computing device, another graphical window from the sequence of graphical windows, the other graphical window including a different group of display elements.

20. The device of claim 16, where the user input includes:
a touch on a touch-sensitive display.

* * * * *